(12) United States Patent
Okuyama

(10) Patent No.: US 7,616,343 B2
(45) Date of Patent: Nov. 10, 2009

(54) IMAGE DATA CONVERSION APPARATUS, IMAGE FORMING APPARATUS, IMAGE DATA CONVERSION METHOD AND PROGRAM

(75) Inventor: Hiroyuki Okuyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/399,040

(22) Filed: Apr. 6, 2006

(65) Prior Publication Data

US 2007/0236711 A1 Oct. 11, 2007

(51) Int. Cl.
G03F 3/08 (2006.01)

(52) U.S. Cl. .................... 358/1.9; 358/518; 358/520; 358/2.1; 382/167

(58) Field of Classification Search ............ 358/1.9, 358/1.13, 2.1, 518, 520, 530; 382/167, 176; 348/655
See application file for complete search history.

(56) References Cited

U.S. PATENT DOCUMENTS

| | | | | |
|---|---|---|---|---|
| 4,926,251 A * | 5/1990 | Sekizawa et al. | ............ | 358/535 |
| 4,954,884 A * | 9/1990 | Nakayama et al. | ........ | 348/225.1 |
| 5,220,620 A * | 6/1993 | Nakano et al. | ............... | 358/520 |
| 7,359,100 B2 * | 4/2008 | Shimizu | ....................... | 358/518 |
| 7,394,561 B2 * | 7/2008 | Moro | ......................... | 358/2.1 |
| 2003/0007696 A1 * | 1/2003 | Saito | .......................... | 382/239 |
| 2003/0214606 A1 * | 11/2003 | Kang | ......................... | 348/655 |
| 2004/0042019 A1 * | 3/2004 | Moro | .......................... | 358/1.9 |
| 2005/0062990 A1 * | 3/2005 | Fujishige et al. | ............. | 358/1.9 |
| 2005/0206927 A1 * | 9/2005 | Yamada | ....................... | 358/1.9 |
| 2006/0062476 A1 * | 3/2006 | Yamada | ....................... | 382/224 |
| 2006/0067575 A1 * | 3/2006 | Yamada | ....................... | 358/1.9 |
| 2006/0170998 A1 * | 8/2006 | Shimizu | ...................... | 358/518 |
| 2006/0215194 A1 * | 9/2006 | Gotoh et al. | ................. | 358/1.9 |
| 2006/0274332 A1 * | 12/2006 | Miyagi | ...................... | 358/1.13 |
| 2007/0103744 A1 * | 5/2007 | Chiba | .......................... | 358/518 |
| 2007/0153020 A1 * | 7/2007 | Inoue | .......................... | 345/591 |
| 2008/0062483 A1 * | 3/2008 | Morimoto | ................... | 358/530 |
| 2008/0106764 A1 * | 5/2008 | Fujino | ......................... | 358/2.1 |
| 2009/0016643 A1 * | 1/2009 | Johnson | ....................... | 382/282 |

FOREIGN PATENT DOCUMENTS

JP 2005-045420 2/2005

* cited by examiner

Primary Examiner—Kimberly A Williams
(74) Attorney, Agent, or Firm—Turocy & Watson, LLP

(57) ABSTRACT

A technology that contributes to improvement of visibility of an image containing an achromatic color is provided. A color space information acquiring unit for acquiring color space information of a pixel contained in image data; a saturation determination unit for determining the saturation of the pixel whose color space information is acquired on the basis of the color space information acquired by the color space information acquiring unit; and a color space information conversion unit for converting the color space information of the pixel whose saturation is determined not to exceed a predetermined threshold by the saturation determination unit out of the pixels contained in the image data into the color space information to be printed with black toner by a predetermined image forming apparatus are provided.

10 Claims, 3 Drawing Sheets

IMAGE DATA CONVERSION APPARATUS, IMAGE FORMING APPARATUS, IMAGE DATA CONVERSION METHOD AND PROGRAM

BACKGROUND OF THE INVENTION

1. Field of the Invention

The present invention relates to an image data conversion process used in an image forming process and, more specifically to an image data conversion apparatus, an image data forming apparatus, and image data conversion method and program for improving visibility of an image that contains an achromatic color.

2. Description of the Related Art

When reading a source document using a digital color Multi Function Peripheral (MFP) or an image reading apparatus and forming an image data, image processing such as a color conversion process, or a filtering process is applied to an image data acquired from reading means such as CCDs or CISs. At this time, when focusing on an achromatic pixel area such as a black character in the source document, in the read image data, values of a red signal, a green signal and a blue signal (hereinafter referred to as RGB signals) are not necessarily the same.

In general, the image reading apparatus executes the filtering process for the RGB signals after having applied with the color conversion process. At this time, the strength of the filter is generally equalized for the respective RGB signals. Assuming that the sharpness in a specific signal is low in a device such as CCDs or CISs, the filter strength may be increased for a specific signal. However, when the filter strength is too strong, the balance of the RGB signals is disrupted in the black part, and hence when the image is displayed, the black part may appear on a display as if it slightly contains a color.

When printing the image data including a black pixel in which the balance of RGB signals is disrupted as described above, since the RGB data values of the pixels in the black part are not equal, the image is not necessarily formed only with black toner when forming the image.

In other words, in the image forming apparatus, the portion of black pixels in which the balance of RGB signals is disrupted as described above may be printed as a mixed color in CMYK. At this time, in the image forming apparatus, a disadvantage such that a color is viewed on a contour of a character due to misalignment of transfer positions of each toner in CMYK may often occur. There arises a problem such that the black character appears in a slightly different color from the achromatic color when the electronic data is printed due to CMY color toner being mixed therein, whereby the visibility is significantly lowered.

SUMMARY OF THE INVENTION

In order to solve the problems described above, it is an object of the present invention to provide a technology that can contribute to improvement of visibility of an image containing an achromatic color.

In order to solve the above-described problem, an image data conversion apparatus according to the present invention includes a color space information acquiring unit for acquiring color space information of a pixel contained in image data; a saturation determination unit for determining the saturation of the pixel whose color space information is acquired on the basis of the color space information acquired by the color space information acquiring unit; and a color space information conversion unit for converting the color space information of the pixel whose saturation is determined not to exceed a predetermined threshold value by the saturation determination unit out of the pixels contained in the image data into the color space information to be printed with black toner by the predetermined image forming apparatus.

The image forming apparatus according to the present invention includes an image data conversion apparatus configured as described above, a transmitting unit for transmitting the image data whose color space information is converted by the color space information conversion unit to the image forming apparatus; and an image forming unit for executing the image forming process on the basis of the image data which is transmitted from the transmitting unit and whose color space information is converted by the color space information conversion unit.

The image data conversion method according to the present invention includes a color space information acquiring step for acquiring color space information of a pixel contained in an image data; a saturation determining step for determining the saturation of the pixel whose color space information is acquired on the basis of the color space information acquired in the color space information acquiring step; and a color space information converting step for converting the color space information of the pixel whose saturation is determined not to exceed a predetermined threshold value in the saturation determining step out of the pixels contained in the image data into the color space information to be printed with black toner by a predetermined image forming apparatus.

An image data conversion program according to the present invention causes a computer to execute a color space information acquiring step for acquiring color space information of a pixel contained in an image data; a saturation determining step for determining the saturation of the pixel whose color space information is acquired on the basis of the color space information acquired in the color space information acquiring step; and a color space information converting step for converting the color space information of the pixel whose saturation is determined not to exceed a predetermined threshold value in the saturation determining step out of the pixels contained in the image data into the color space information to be printed with black toner by a predetermined image forming apparatus.

DESCRIPTION OF THE EMBODIMENTS

Figure 1:
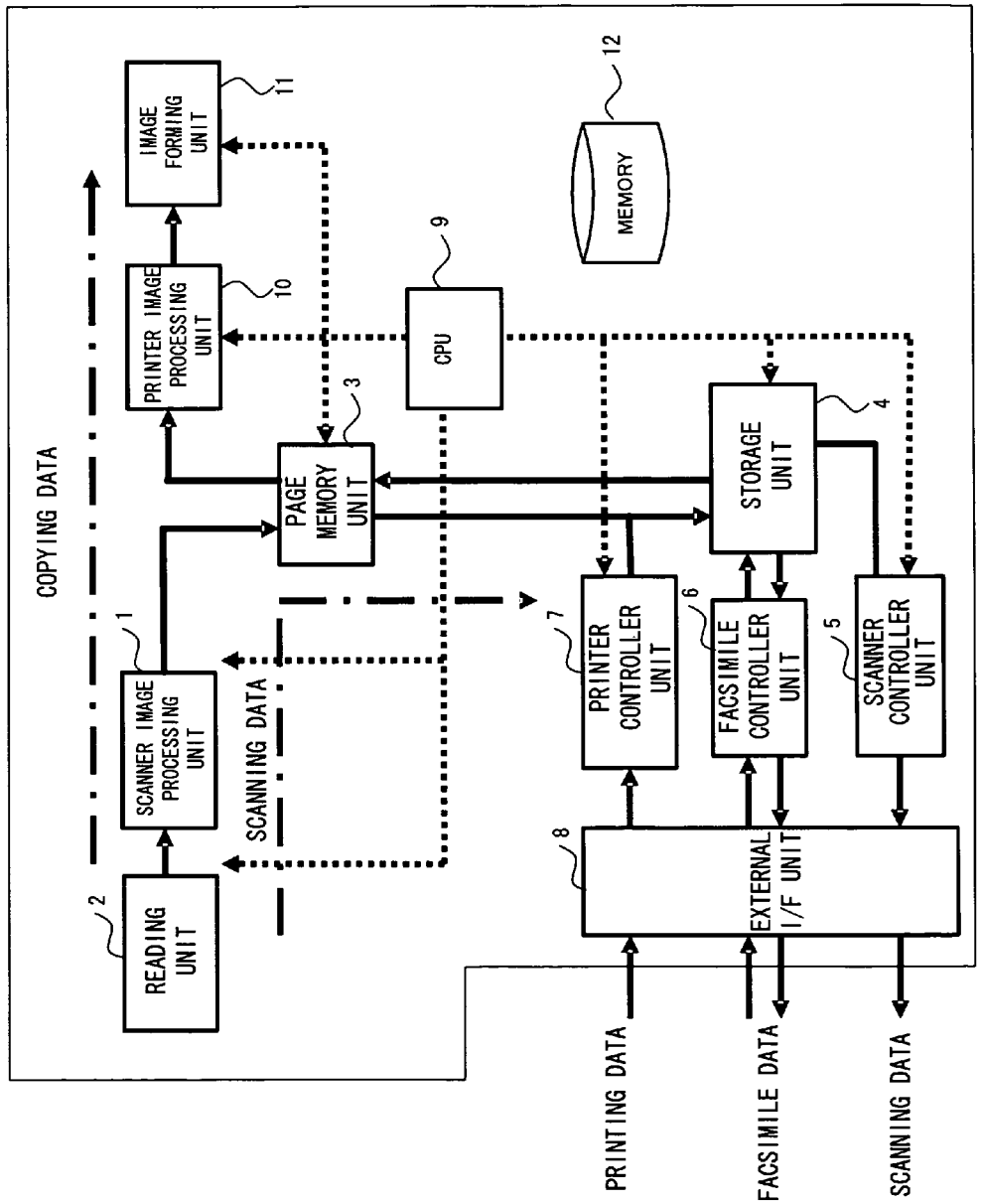
FIG. 1 is a drawing showing a system configuration of an image forming apparatus according to the present embodiment.

Referring now to the drawings, an embodiment of the present invention will be described.

FIG. 1 is a drawing showing a system configuration of an image forming apparatus according to the present embodiment.

An image forming apparatus 900 in the present embodiment includes a scanner image processing unit 1, a reading unit 2, a page memory unit 3, a storage unit 4, a scanner controller unit 5, a facsimile controller unit 6, a printer controller unit 7, an external I/F unit 8, a CPU 9, a printer image processing unit 10, an image forming unit 11 and a memory 12. The image forming apparatus 900 in the present embodiment includes a copying function, a printing function, a scanning function, a facsimile function, a storage function and so on.

Subsequently, the function of the scanner image processing unit (corresponding to the image data conversion apparatus) 1 in the image forming apparatus 900 according to the present embodiment will be described in detail.

Figure 2:
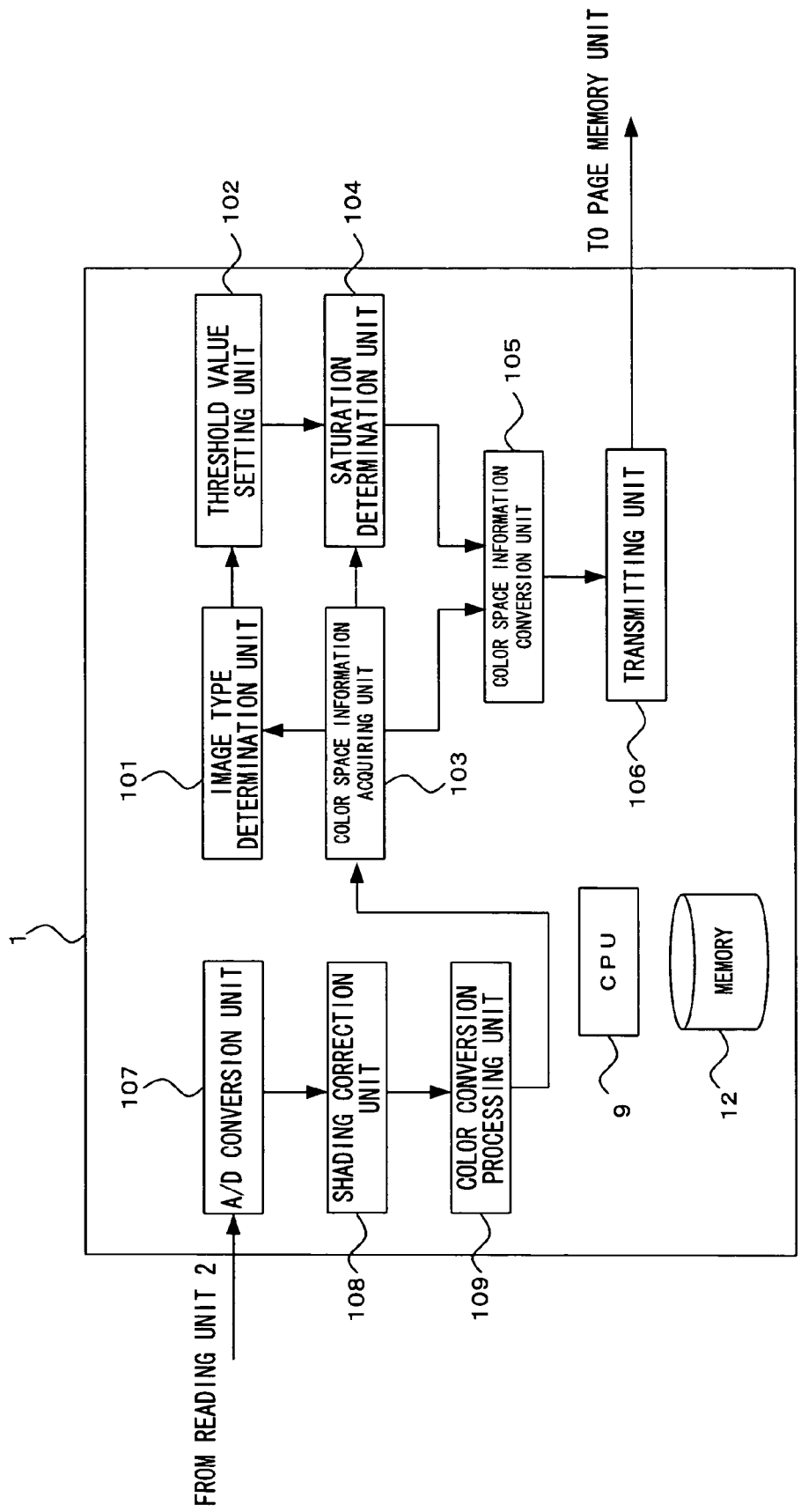
FIG. 2 is a functional block diagram for explaining a scanner image processing unit 1 according to the present embodiment in detail.

FIG. 2 is a functional block diagram for explaining the scanner image processing unit 1 in the present embodiment in detail. The scanner image processing unit 1 (image data conversion apparatus) in the present embodiment includes an image type determination unit 101, a threshold value setting unit 102, a color space information acquiring unit 103, a saturation determination unit 104, a color space information conversion unit 105, a transmitting unit 106, an A/D conversion unit 107, a shading correction unit 108, a color conversion processing unit 109, the CPU 9 and the MEMORY 12.

As shown in FIG. 2, an image signal that the scanner image processing unit 1 acquires from the reading unit 2 such as CCDs or CISs is converted into a digital signal by an amplifier, not shown, and the A/D conversion unit 107, is applied with a preprocessing by the shading correction unit 108, and then is converted into RGB signals corresponding to a standard color space by the color conversion processing unit 109. More specifically, the color conversion processing unit 109 converts image data (RAW data, for example) that depends on a device such as the CCDs or the CISs into image data expressed by standard color space signals such as sRGB.

The image type determination unit 101 determines the type of an image in image data from which the color space information acquiring unit 103 acquires the color space information (described later in detail). More specifically, the image type determination unit 101 determines whether or not pixels from which the color space information acquiring unit 103 acquires the color space information are part or all of at least one of a character and a line work. Identification of the character or the line work by the image type determination unit 101 here is to be executed by an edge detection process, an achromatic color determination process and a layout analyzing process. The image type determination unit 101 also has a function to determine which one of the line work, a photo, and the character the image in the image data corresponds to.

The threshold value setting unit 102 sets a predetermined threshold value on the basis of the type determined by the image type determination unit 101. In this manner, by changing the threshold value that is a criterion in the saturation determination unit 104 described later according to the type (line work, photo, character) of the image, adjustment such that accurate printing in black color is achieved for image data which must be viewed in real black when being printed and a reduced threshold value is set for the image data in which the black color does not have to be reproduced so faithfully is enabled.

The color space information acquiring unit 103 acquires color space information of a pixel contained in image data that is an object of the image forming process to be executed by the image forming unit 11. In this case, the image data as the object of the image forming process in the image forming unit 11 is image data having applied with the conversion process in the color conversion processing unit 109. Although the image data is assumed to be an object of the image forming process as an example here, it is not limited thereto, and the object for acquiring the color space information may be image data or the like acquired from the image data or a data base that is simply scanned by the reading unit 2.

The saturation determination unit 104 determines the saturation of the pixel from which the color space information is acquired on the basis of the color space information acquired by the color space information acquiring unit 103. The saturation determination unit 104 determines that the saturation of the pixel which has color space information;

$$|R-G|<Th1, |G-B|<Th2, |B-R|<Th3 \qquad (1)$$

where the color space information acquired by the color space information acquiring unit 103 is represented by the RGB signals including R value, G value and B value, and Th1, Th2 and Th3 represent predetermined threshold values, does not exceed the predetermined threshold value. The saturation determination unit 104 executes the determination process as described above on the basis of the threshold values Th1, Th2 and Th3 set in the threshold value setting unit 102 described above when determining the saturation of the pixel. The threshold values Th1, Th2 and Th3 in this case may all be set to an equal value.

The color space information conversion unit 105 converts the color space information of the pixels whose saturations are determined not to exceed the predetermined threshold value by the saturation determination unit 104 out of the pixels contained in the image data into the color space information to be printed with black toner by the predetermined image forming apparatus.

When the color space information acquired by the color space information acquiring unit 103 is represented by the RGB signals including the R value, G value and B value, the color space information conversion unit 105 converts the color space information of the pixels, whose saturations are determined not to exceed the predetermined threshold value by the saturation determination unit 104, contained in the image data so that the R value, G value and B value of the color space information become the equal value. Assuming that the $R_0$, $G_0$ and $B_0$ represent the color space information before conversion process by the color space information conversion unit 105, the color space information R, G and B of the pixels after having applied with the conversion process by the color space information conversion unit 105 are expressed by the following expression 2.

$$R=G=B=(R_0+G_0+B_0)/3 \qquad (2)$$

Alternatively, the color space information converting unit 105 can also be adapted to convert the color space information of the pixels whose saturations are determined not to exceed the predetermined threshold value by the saturation determination unit 104 and which are determined to be part or all of at least one of the character and the line work by the image type determination unit 101 out of the pixels contained in the image data into the color space information to be printed with black toner by the image forming apparatus. Accordingly, pixels in the achromatic color in the image whose black part should be expressed in single black color in many cases when being printed, such as the characters or the line works, can be expressed faithfully, which may contribute to improvement of visibility.

Although the conversion process of the color space information executed by the color space information conversion unit 105 has a configuration in which the RGB values are the equal value in the present embodiment, the R value, the G value and the B value do not have to be necessarily the equal value, and they may be any level of values (ratio) as long as it is viewed as a black color on a monitor, or it is determined to be a color which is to be printed with black toner by the image forming unit 11.

Since the pixels whose saturations are determined to exceed the predetermined threshold value by the saturation determination unit 104 must be printed with color toners, the image data is outputted to a downstream processing block in an unconverted state without executing the process by the color space information conversion unit 105.

The transmitting unit 106 transmits the image data whose color space information is converted by the color space information conversion unit 105 to the page memory, the image forming unit 11 or a device (such as a Personal Computer) that executes a predetermined process such as displaying on a screen or storing in a storage medium for the image data.

The CPU 9 has a role to perform various processes in the image data conversion apparatus, and also a role to realize various functions by executing programs stored in the MEMORY 12. The MEMORY 12 is composed of a ROM, a RAM or the like and has a role to store various information or programs used in the image data conversion apparatus. Although the CPU 9 and the MEMORY 12 are shared by the image forming apparatus 900 in the configuration shown here, a configuration in which they are additionally provided specifically for the image data conversion apparatus may be employed.

Figure 3:
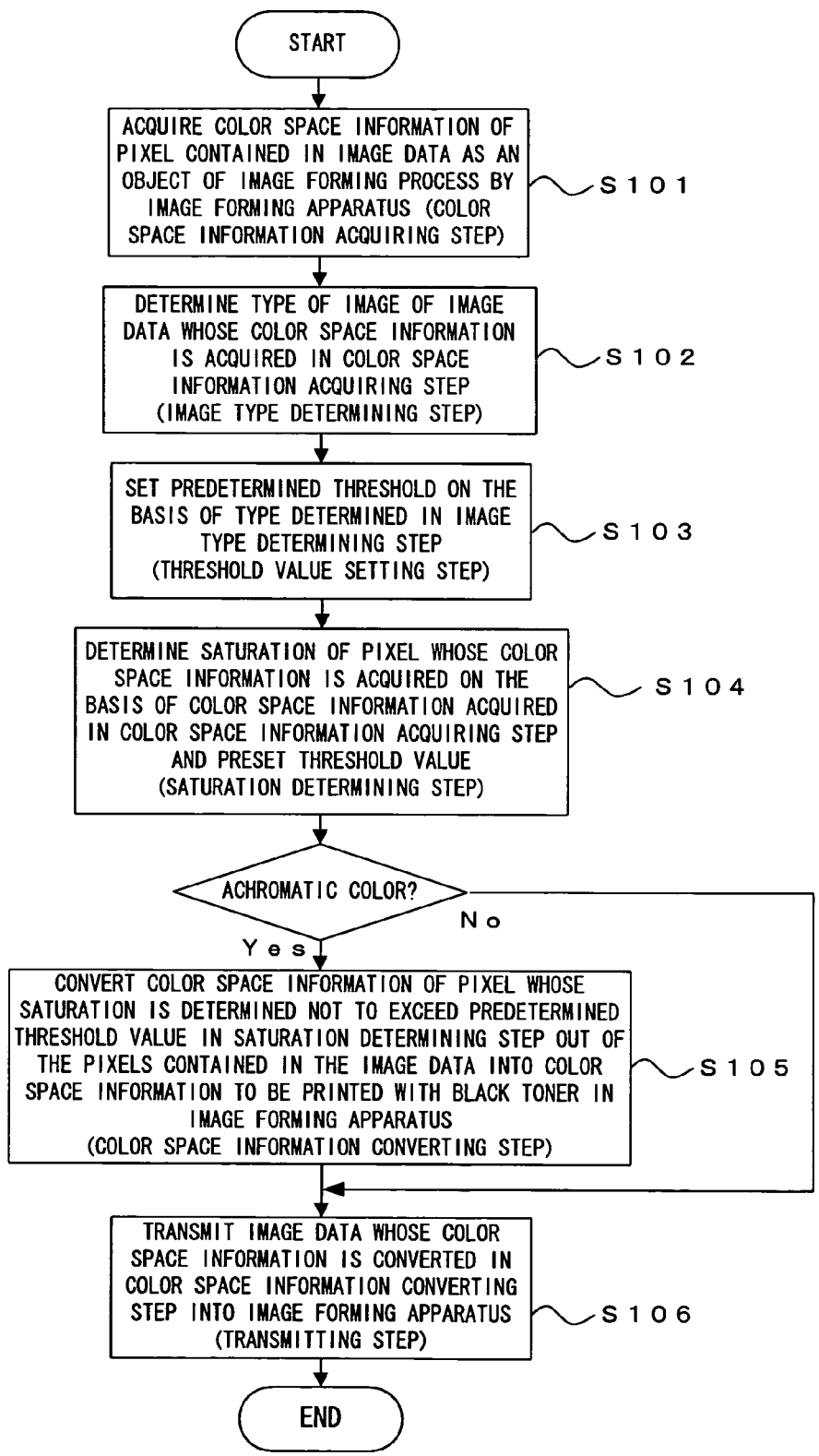
FIG. 3 is a flowchart for explaining a flow of a process in an image data conversion apparatus (image data conversion method) according to the present embodiment.

FIG. 3 is a flowchart for explaining a flow of a process in the image data conversion apparatus (image data conversion method) according to the present embodiment.

The color space information acquiring unit 103 acquires the color space information of the pixels contained in the image data (color space information acquiring step) (S101).

The image type determination unit 101 determines the type of the image in the image data whose color space information is acquired in the color space information acquiring step (image type determining step) (S102). The image type determining step determines whether or not the pixels whose color space information is acquired in the color space information acquiring step are part or all of at least one of the character or the line work. The image type determination unit 101 also determines which one of the photo, the line work and the character the image in the image data is.

Subsequently, the threshold value setting unit 102 sets a predetermined threshold value on the basis of the type determined in the image type determining step (threshold value setting step) (S103).

The saturation determination unit 104 determines the saturations of the pixels from which the color space information is acquired on the basis of the color space information acquired in the color space information acquiring step and the above-described threshold value (saturation determining step) (S104).

The color space information conversion unit 105 converts the color space information of the pixels whose saturations are determined not to exceed the predetermined threshold value in the saturation determining step out of the pixels contained in the image data into the color space information printed with black toner by the predetermined image forming apparatus (color space information converting step) (S105). More specifically, in the color space information converting step, assuming that the color space information acquired in the color space information acquiring step is expressed in the RGB signals including the R value, the G value, and the B value, the color space information of the pixels, which are contained in the image data and whose saturations are determined not to exceed the predetermined threshold value in the saturation determining step, is converted so that the R value, G value and B value in the color space information become the equal value. In the color space information converting step, the color space information of the pixels whose saturations are determined not to exceed the predetermined threshold value in the saturation determining step and which is determined to be part or all of at least one of the character and the line work in the image type determining step out of the pixels contained in the image data may be converted into the color space information to be printed with black toner by the image forming apparatus.

The transmitting unit 106 transmits the image data whose color space information is converted in the color space information converting step to the image forming apparatus (transmitting step) (S106).

These processes (S103-S105) are executed on all the pixels in the image data which is to be printed, and the black character area including colors close to the achromatic color is replaced by the RGB values or the like. Accordingly, when executing the filtering process (sharpening process) on the image data before printing, even when the balance of filter strengths for the RGB signals is disrupted to some extent, since the signal values of the RGB signals of the color space information before processing are the equal value, color reproduction does not change significantly toward the chromatic color. The image data processed in this manner is entered into the scanner controller unit 5 via the page memory unit 3 and the storage unit 4, where a coding process such as JPEG process is applied, and then is transmitted to the external device such as the PC via the external I/F unit 8.

The respective steps in the process in the image data conversion apparatus described above are achieved by causing the CPU 9 to execute the image data conversion program stored in the MEMORY 12.

Although the present embodiment has been described assuming that the function to implement the present invention is stored in advance in the apparatus, the invention is not limited thereto, and the corresponding function can be downloaded from the network to the device or the same function stored in the storage medium may be installed in the apparatus. The recording medium may be of any form as long as it can store the program and the apparatus can read it, such as CD-ROMs. The function obtained by installing or downloading in advance as described above may be the one that achieves the function in cooperation with the Operating System or the like in the apparatus.

As described above, by providing the image data conversion apparatus according to the present embodiment and the image forming unit 11 that executes the image forming process on the basis of the image data whose color space information is converted by the color space information conversion unit 105 transmitted from the transmitting unit 106, the image forming apparatus 900 that achieves the effects of the image data conversion apparatus according to the present embodiment is provided.

In addition, needless to say, the image processing apparatus that transmits the image data transmitted from the image data conversion apparatus according to the present embodiment to the external device such as the PC, and the image reading apparatus having a configuration in which the image data of the source document read in the image reading unit is transmitted to the image data conversion apparatus according to the present embodiment are also provided.

According to the present embodiment, the pixel areas in a color close to the achromatic color can be detected to convert the RGB signal values into the equal value when generating the electronic data, so that visibility when the black part contained in the image data is displayed on the monitor is significantly improved.

Although the present invention has been described in detail on the basis of a specific form, it will be understood by those skilled in the art that various modifications and changes in quality may be made without departing the spirit and the scope of the present invention.

As described thus far, according to the present invention, the technology that can contribute to improvement of visibility of the image which contains an achromatic color can be provided.

What is claimed is:

1. An image data conversion apparatus comprising:
a color space information acquiring unit that acquires color space information of a pixel contained in image data;
a saturation determination unit that determines the saturation of the pixel whose color space information is acquired on the basis of the color space information acquired by the color space information acquiring unit;
a color space information conversion unit that converts the color space information of the pixel whose saturation is determined not to exceed a predetermined threshold value by the saturation determination unit out of the pixels contained in the image data into the color space information to be printed with black toner by a predetermined image forming apparatus;
wherein the saturation determination unit determines that the saturation of the pixel which has color space information:

$|R-G|<Th1, |G-B|<Th2, |B-R|<Th3$ where the color space information acquired by the color space information acquiring unit is represented by RGB signals including R value, G value and B value, and Th1, Th2 and Th3 represent predetermined threshold values, does not exceed the predetermined threshold value;
an image type determination unit that determines the type of the image of the image data whose color space information is acquired by the color space information acquiring unit; and
a threshold value setting unit that sets the predetermined threshold value on the basis of the type determined by the image type determination unit.

2. The image data conversion apparatus according to claim 1, wherein when the color space information acquired by the color space information acquiring unit is represented by the RGB signals including the R value, G value and B value, the color space information conversion unit converts the color space information of the pixels, whose saturations are determined not to exceed the predetermined threshold value by the saturation determination unit, contained in the image data so that the R value, G value and B value of the color space information become the equal value.

3. The image data conversion apparatus according to claim 1 comprising: the image type determination unit that determines the type of the image in the image data whose color space information is acquired by the color space information acquiring unit;
wherein an image type determination unit determines whether or not the pixel whose color space information is acquired by the color space information acquiring unit is part or all of at least one of a character and a line work,
wherein the color space information conversion unit converts the color space information of the pixels whose saturations are determined not to exceed the predetermined threshold value by the saturation determination unit and which are determined to be part or all of at least one of the character and the line work by the image type determination unit out of the pixels contained in the image data into the color space information to be printed with black toner by the predetermined image forming apparatus.

4. The image data conversion apparatus according to claim 1 comprising:
a transmitting unit that transmits the image data whose color space information is converted by the color space information conversion unit to the image forming apparatus; and
an image forming unit that executes the image forming process on the basis of the image data which is transmitted from the transmitting unit and whose color space information is converted by the color space information conversion unit.

5. An image data conversion method comprising:
a color space information acquiring step that acquires color space information of a pixel contained in image data;
a saturation determining step that determines the saturation of the pixel whose color space information is acquired on the basis of the color space information acquired in the color space information acquiring step;
a color space information converting step that converts the color space information of the pixel whose saturation is determined not to exceed a predetermined threshold value in the saturation determining step out of the pixels contained in the image data into the color space information to be printed with black toner by the predetermined image forming apparatus;
wherein the saturation determining step determines that the saturation of the pixel which has color space information:

$|R-G|<Th1, |G-B|<Th2, |B-R|<Th3$ where the color space information acquired in the color space information acquiring step is represented by RGB signals including R value, G value, and B value, and Th1, Th2, and Th3 represent predetermined threshold values, does not exceed the predetermined threshold value;
an image type determining step that determines the type of the image of the image data whose color space information is acquired in the color space information acquiring step; and
a threshold value setting step that sets the predetermined threshold value on the basis of the type determined in the image type determining step.

6. The image data conversion method according to claim 5, wherein when the color space information acquired in the color space information acquiring step is represented by the RGB signals including the R value, G value and B value, the color space information converting step converts the color space information of the pixels, whose saturations are determined not to exceed the predetermined threshold value in the saturation determining step, contained in the image data so that the R value, G value and B value of the color space information become the equal value.

7. The image data conversion method according to claim 5 comprising:
an image type determining step that determines the type of the image in the image data whose color space information is acquired in the color space information acquiring step;
wherein the image type determining step determines whether or not the pixel whose color space information is acquired in the color space information acquiring step is part or all of at least one of a character and a line work, wherein the color space information converting step converts the color space information of the pixels whose saturations are determined not to exceed the predetermined threshold value in the saturation determining step and which are determined to be part or all of at least one of the character and the line work in the image type determining step out of the pixels contained in the image data into the color space information to be printed with black toner by the predetermined image forming apparatus.

8. A computer readable storage medium having stored thereon an image data conversion program for causing a computer to execute a color space information acquiring step for acquiring color space information of a pixel contained in image data;

a saturation determining step that determines the saturation of the pixel whose color space information is acquired on the basis of the color space information acquired in the color space information acquiring step; and a color space information converting step that converts the color space information of the pixel whose saturation is determined not to exceed the predetermined threshold value in the saturation determining step out of the pixels contained in the image data into the color space information to be printed with black toner by the predetermined image forming apparatus;

wherein the saturation determining step determines that the saturation of the pixel which has color space information;

$|R-G|<Th1, |G-B|<Th2, |B-R|<Th3$ where the color space information acquired in the color space information acquiring step is represented by RGB signals including R value, G value and B value, and Th1, Th2 and Th3 represent predetermined threshold values, does not exceed the predetermined threshold value;

an image type determining step that determines the type of the image of the image data whose color space information is acquired in the color space information acquiring step; and a threshold value setting step that sets the predetermined threshold value on the basis of the type determined in the image type determining step.

9. The image data conversion program according to claim 8, wherein when the color space information acquired in the color space information acquiring step is represented by the RGB signals including the R value, G value and B value, the color space information converting step converts the color space information of the pixels, whose saturations are determined not to exceed the predetermined threshold value in the saturation determining step, contained in the image data so that the R value, G value and B value of the color space information become the equal value.

10. The image data conversion program according to claim 8 comprising;

an image type determining step that determines the type of the image in the image data whose color space information is acquired in the color space information acquiring step;

wherein the image type determining step determines whether or not the pixel whose color space information is acquired in the color space information acquiring step is part or all of at least one of a character and a line work, wherein the color space information converting step converts the color space information of the pixels whose saturations are determined not to exceed the predetermined threshold value in the saturation determining step and which are determined to be part or all of at least one of the character and the line work in the image type determining step out of the pixels contained in the image data into the color space information to be printed with black toner by the predetermined image forming apparatus.

* * * * *